US009991763B1

(12) United States Patent
Downs et al.

(10) Patent No.: US 9,991,763 B1
(45) Date of Patent: Jun. 5, 2018

(54) GAS TURBINE ENGINE WITH MULTIPLE ELECTRIC GENERATORS

(71) Applicant: Florida Turbine Technologies, Inc., Jupiter, FL (US)

(72) Inventors: James P Downs, Hobe Sound, FL (US); Robert L Memmen, Stuart, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 0 days. days.

(21) Appl. No.: 15/616,590

(22) Filed: Jun. 7, 2017

Related U.S. Application Data

(60) Provisional application No. 62/501,289, filed on May 4, 2017.

(51) Int. Cl.
| | | |
|---|---|---|
| F02B 63/04 | (2006.01) |
| H02K 7/10 | (2006.01) |
| H02K 7/18 | (2006.01) |
| F01D 15/10 | (2006.01) |
| F01D 15/12 | (2006.01) |
| B64D 27/10 | (2006.01) |
| B64D 27/24 | (2006.01) |
| B64D 35/02 | (2006.01) |
| B64C 39/02 | (2006.01) |
| H02K 7/116 | (2006.01) |
| H02K 7/108 | (2006.01) |
| F02D 29/06 | (2006.01) |
| H02P 9/04 | (2006.01) |
| B64D 27/02 | (2006.01) |

(52) U.S. Cl.
CPC ......... *H02K 7/1823* (2013.01); *B64C 39/024* (2013.01); *B64D 27/10* (2013.01); *B64D 27/24* (2013.01); *B64D 35/02* (2013.01); *F01D 15/10* (2013.01); *F01D 15/12* (2013.01); *H02K 7/108* (2013.01); *H02K 7/116* (2013.01); *B64C 2201/042* (2013.01); *B64C 2201/048* (2013.01); *B64D 2027/026* (2013.01); *F05D 2220/323* (2013.01); *F05D 2240/60* (2013.01); *F05D 2260/40311* (2013.01)

(58) Field of Classification Search
USPC .......................................... 290/1 C, 40 C, 44
See application file for complete search history.

(56) References Cited

U.S. PATENT DOCUMENTS

| 4,274,023 A * | 6/1981 | Lamprey | H02K 7/116 |
| | | | 310/83 |
| 4,554,989 A * | 11/1985 | Gruich | B60K 3/04 |
| | | | 180/6.5 |

(Continued)

*Primary Examiner* — Pedro J Cuevas
(74) *Attorney, Agent, or Firm* — John Ryznic

(57) ABSTRACT

A power plant for a small aircraft with a gas turbine engine that drives a number of electric generators, where a gear box transmit power from the engine shaft to the number of generators, the gear box having a single input shaft that drives a number of driven gears with each driven gear having a generator drive shaft that extends out both sides, and an electric generator connected to each side of the drive shaft. A compact arrangement of generators are formed where each generator can be disengaged from the drive shaft to regulate total electrical output or to prevent a damaged generator from causing damage to other parts of the system or aircraft.

5 Claims, 5 Drawing Sheets

(56) References Cited

U.S. PATENT DOCUMENTS

| | | | | |
|---|---|---|---|---|
| 4,691,119 | A * | 9/1987 | McCabria | H02K 7/116 290/4 C |
| 6,304,002 | B1 * | 10/2001 | Dehlsen | F16H 1/22 290/1 C |
| 6,700,263 | B1 * | 3/2004 | Kong | H02K 53/00 290/1 C |
| 6,731,017 | B2 * | 5/2004 | Mikhail | F16H 1/22 290/1 C |
| 6,951,443 | B1 * | 10/2005 | Blakemore | F03D 7/0224 415/155 |
| 7,042,110 | B2 * | 5/2006 | Mikhail | F03D 7/0224 290/40 C |
| 7,069,802 | B2 * | 7/2006 | Mikhail | F16H 1/22 74/410 |
| 7,495,353 | B2 * | 2/2009 | Christensen | F02C 7/32 290/40 C |
| 7,675,189 | B2 * | 3/2010 | Grenier | F03D 15/00 290/43 |
| 8,178,991 | B2 * | 5/2012 | Smith | F03D 1/025 290/44 |
| 8,232,700 | B2 * | 7/2012 | Dooley | H02K 16/02 310/113 |
| 8,253,268 | B1 * | 8/2012 | Smith | F03D 1/025 290/44 |
| 8,482,150 | B2 * | 7/2013 | Smith | F03D 1/025 290/44 |
| 8,502,403 | B2 * | 8/2013 | Merswolke | F03D 9/25 290/44 |
| 8,710,694 | B2 * | 4/2014 | Smith | H02P 9/06 290/44 |
| 8,836,158 | B2 * | 9/2014 | Cho | H02P 9/04 290/55 |
| 8,851,839 | B2 * | 10/2014 | Eckart | F03D 7/0272 416/9 |
| 8,912,681 | B1 * | 12/2014 | Filkins | F03D 15/00 290/44 |
| 9,377,083 | B2 * | 6/2016 | Chung | F16H 37/065 |
| 9,561,763 | B2 * | 2/2017 | Klemen | H02P 5/60 |
| 9,617,979 | B2 * | 4/2017 | Smith | F03D 9/25 |
| 2005/0012339 | A1 * | 1/2005 | Mikhail | F03D 7/0224 290/44 |
| 2005/0269822 | A1 * | 12/2005 | Kinpara | F03D 3/005 290/40 C |
| 2006/0151664 | A1 * | 7/2006 | Yu | B63H 13/00 244/4 R |
| 2011/0223017 | A1 * | 9/2011 | Smith | F03D 1/025 416/1 |
| 2012/0308386 | A1 * | 12/2012 | Piech | F03D 15/00 416/170 R |
| 2013/0052013 | A1 * | 2/2013 | Eckart | F03D 7/0272 416/9 |
| 2013/0277971 | A1 * | 10/2013 | Cho | H02P 9/04 290/44 |
| 2015/0115614 | A1 * | 4/2015 | Smith | F03D 1/025 290/1 C |
| 2018/0029584 | A1 * | 2/2018 | Ishikawa | B60W 10/115 |

* cited by examiner

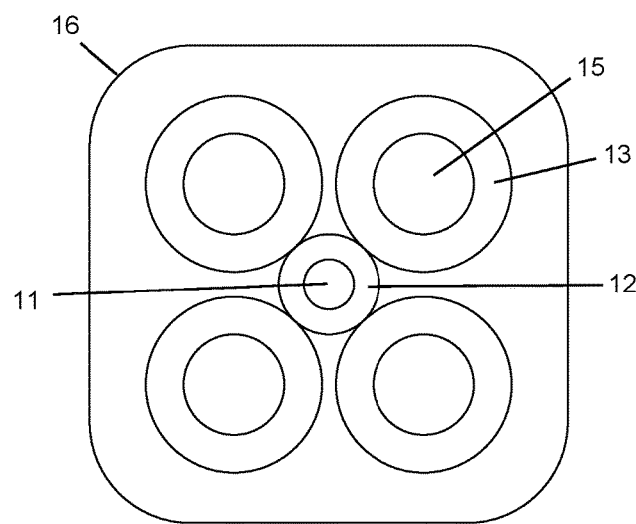
FIG 2
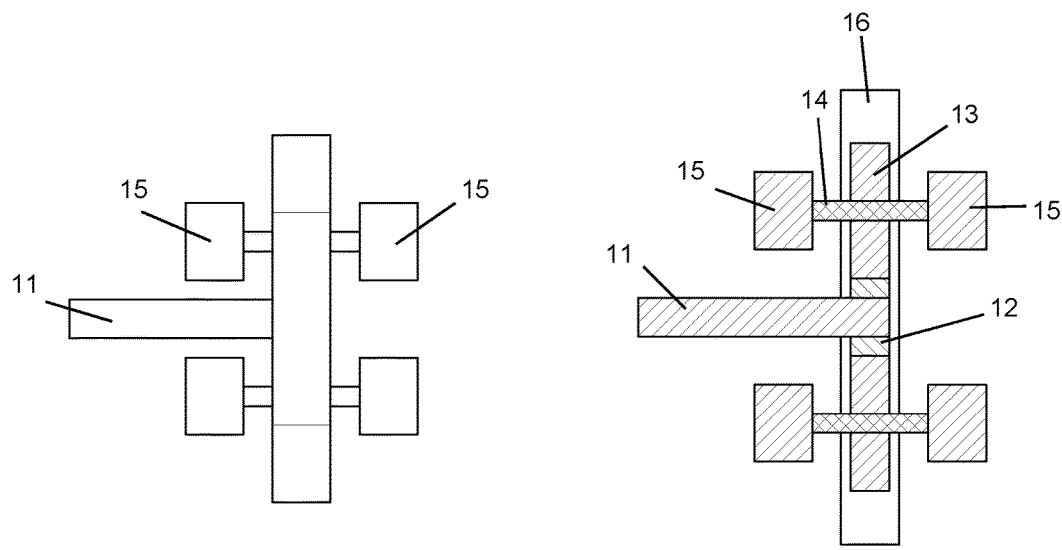
FIG 3
FIG 4

GAS TURBINE ENGINE WITH MULTIPLE ELECTRIC GENERATORS

CROSS-REFERENCE TO RELATED APPLICATIONS

This application claims the benefit to U.S. Provisional Application 62/501,289 filed on May 4, 2017 and entitled GAS TURBINE ENGINE WITH MULTIPLE ELECTRIC GENERATORS.

GOVERNMENT LICENSE RIGHTS

None.

BACKGROUND OF THE INVENTION

Field of the Invention

The present invention relates generally to an electric power plant, and more specifically to an aero gas turbine engine that drives multiple electric generators.

Description of the Related Art Including Information Disclosed Under 37 CFR 1.97 and 1.98

An aircraft such as a UAV (Unmanned Aero Vehicle), a remotely-piloted vehicle, or a man-rated system can be powered by a small gas turbine engine that drives an electric generator to produce electrical power, where the electrical power is used to drive a number of electric motors connected to fans. Some small UAVs can have more than 20 fans for both propulsion and steering. With a power plant having many electric generators, if one generator malfunctions, the other generators can make up for the lost electrical power. Also, several of the generators can be taken off line when power requirement is low.

BRIEF SUMMARY OF THE INVENTION

A power plant for an aircraft that is driven by a number of fans each driven by an electric motor, where the power plant includes a number of electric generators all driven by an single input shaft that is connected to an engine such as a gas turbine engine. A gearbox includes an input shaft with a central drive gear that drives a number of driven gears, where each driven gear includes a generator drive shaft that extends outward from the gearbox. For generator shafts that extend in both directions away from the driven gear, each end of the generator drive shaft is connected to an electric generator. Thus, a number of electric generators are located around the gearbox to produce a compacted arrangement of electric generators all driven by a single input shaft.

In a second embodiment, an inner arrangement of electric generators are driven by an arrangement of inner driven gears, and an outer arrangement of electric generators are driven by an arrangement of outer driven gears, where each of the inner and outer driven gears have generators on both of the two ends of the generator drive shafts. In one embodiment of the second embodiment, 24 electric generators are arranged on both sides of the gearbox and all are driven by a single input shaft.

BRIEF DESCRIPTION OF THE SEVERAL VIEWS OF THE DRAWINGS

FIG. 2 shows a cross section front view of a gearbox used in the power plant of FIG. 1.

FIG. 3 shows a side view the power plant of FIG. 1.

FIG. 4 shows a cross section side view of the power plant of FIG. 1.

DETAILED DESCRIPTION OF THE INVENTION

Figure 9:
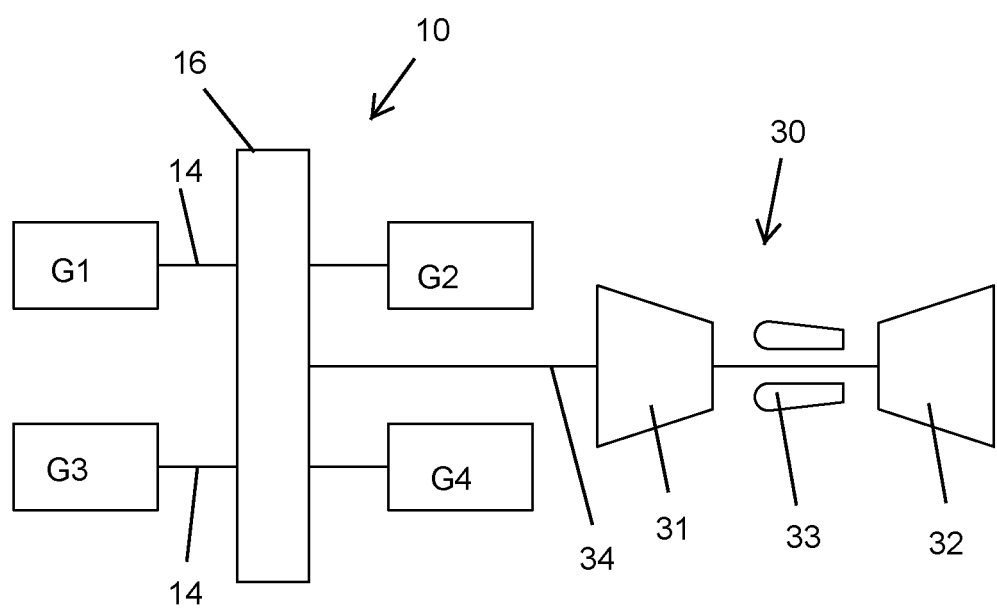
FIG. 9 shows a gearbox with electric generators driven by a gas turbine engine.

The present invention is a gas turbine engine that drives multiple electric generators that provides electrical power to fans used to propel and steer an aircraft such as a small UAV, remotely piloted vehicle or man-rated system. FIG. 9 shows a cross-section view of an electric power plant with a gas turbine engine 30 that includes a compressor 31 driven by a turbine 32 with a combustor 33 in-between to produce a hot gas stream that drives the turbine 32. An external or main drive shaft 34 extends out from the gas turbine engine 30 from the compressor 31 side. The main drive shaft 34 can also extend from the turbine side of the engine 30. The main drive shaft 34 is connected to a gearbox input shaft 11 which drives gearbox 16 from which the multiple electric generators extend and are driven from. The FIG. 9 embodiment shows four electric generators 15 (G1-G4) with two generators G1 and G2 extending from a forward side of the gearbox 16 and the other two generators G3 and G4 extending from the aftward side of the gearbox 16.

Figure 1:
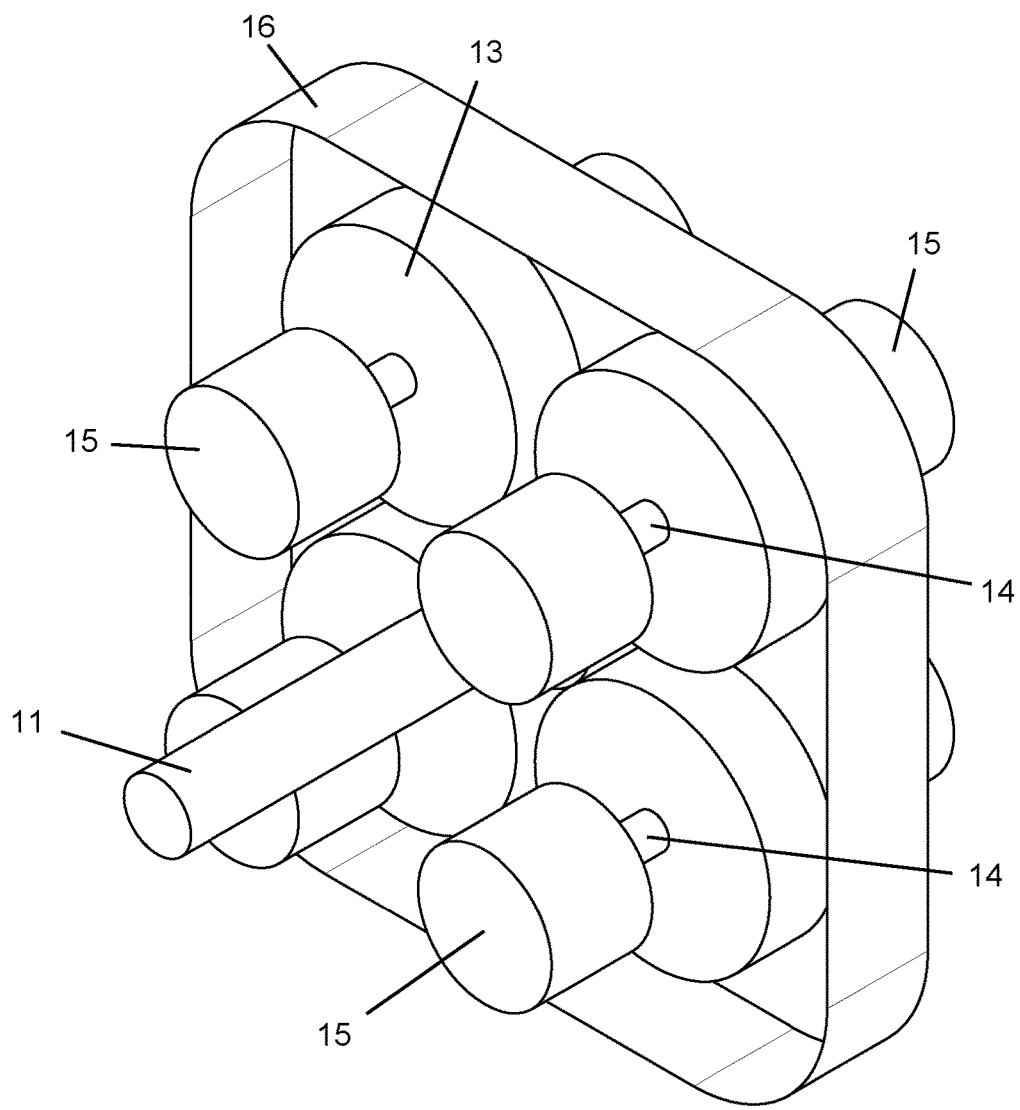
FIG. 1 shows an isometric view of an electric power plant gearbox for an aircraft according to a first embodiment of the present invention.

FIGS. 1 and 2 show isometric and front views of the gearbox 16 in general. A first embodiment of the present invention includes a gearbox input shaft 11 connected to a central drive gear 12 also connected directly to a main drive shaft 34 of the engine 30 and rotates along with the input shaft 11. In another embodiment, the main drive shaft 34 of the engine 30 and the input shaft 11 of the gearbox 16 can be one shaft. The central drive gear 12 drives multiple outer driven gears 13 that are arranged annularly and are spaced around the central drive gear 12. In the FIG. 1 embodiment, the gearbox 16 can drive eight electric generators 15. Each of the outer driven gears 13 includes a generator drive shaft 14 that drives an electric generator 15. Thus, the engine 30 drives the input shaft 11 through the engine drive shaft 34, which drives the central gear 12, that drives each of the outer driven gears 13, where the outer driven gears each drive a generator drive shaft 14 connected to an electric generator 15. In the FIG. 1 embodiment, the gearbox 16 drives eight electric generators with four generators 15 on a forward side and four generators 15 on an aftward side. Each of the four outer driven gears 13 has a generator drive shaft 14 that extends out both sides of the gearbox 16. In another embodiment, less than eight generators can be driven such as six with three on the forward side and three on the aftward side of the gearbox 16.

FIG. 3 shows a side view of the gearbox 16 with generators 15 on both sides. The gearbox input shaft 11 extends out one side of the gearbox 16 and is connected to the engine drive shaft 34. Two generators 15 are shown on one side of the gearbox 16 with two more generators 15 on the opposite side. The generator drive shafts 14 extend out from both sides of the gearbox 16 and connect to a generator 15 on each end. FIG. 4 shows a cross section view of the gearbox 16 with the gearbox input shaft 11 connected to the central drive gear 12, the driven outer gears 13, the generator drive shafts 14, and the electric generators 15 connected to the generator drive shafts 14.

FIGS. 5 thru 8 show a second embodiment of the power plant with multiple electric generators driven by one input shaft. In the first embodiment shown in FIGS. 1-4, all the electric generators are driven by the central drive shaft of the input shaft 11. This forms an inner arrangement of electric generators. In the second embodiment of FIG. 5-8, an outer arrangement of generators is included along with the inner arrangement of generators. The inner driven gears drive the outer driven gears.

Figure 5:
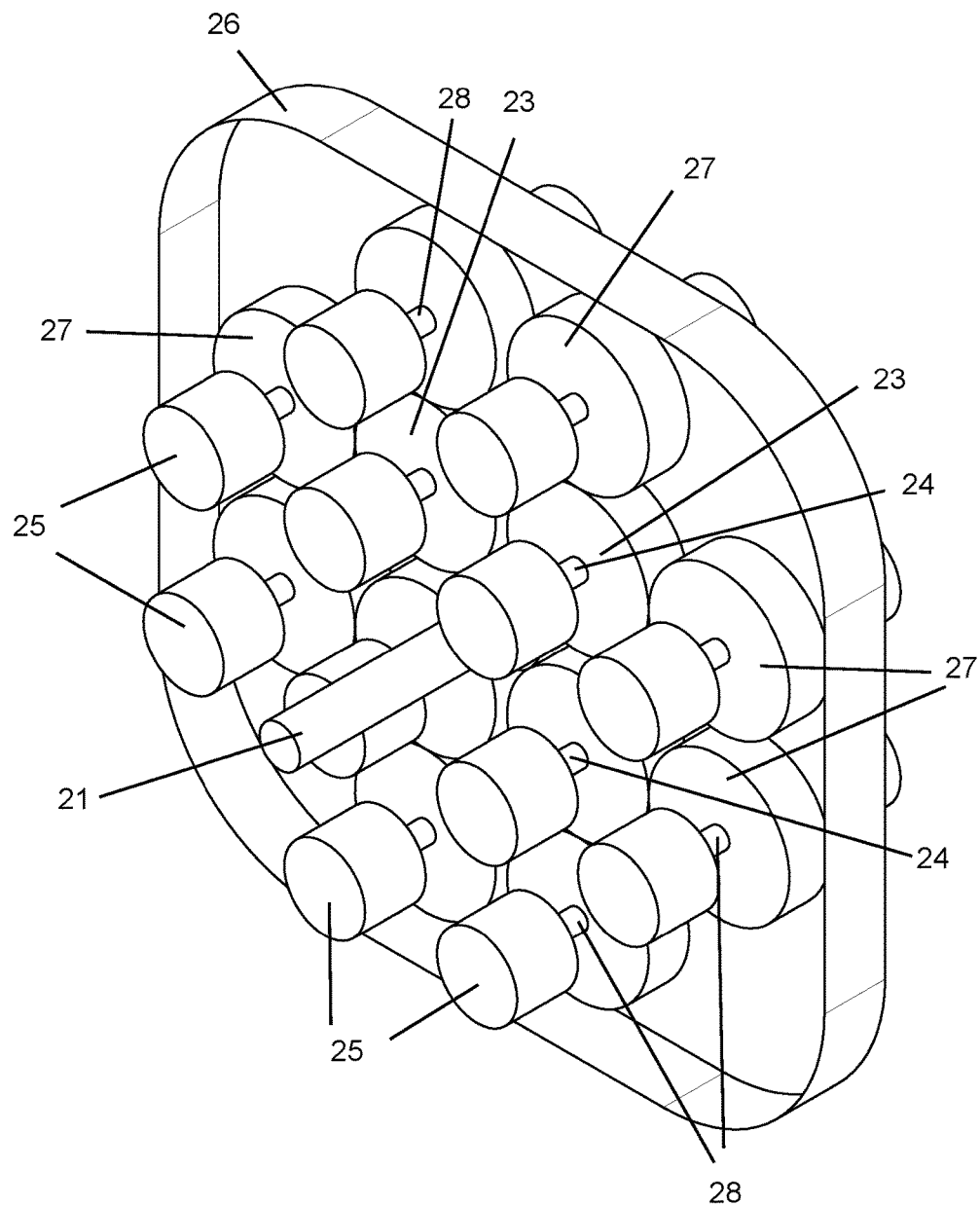
FIG. 5 shows an isometric view of an electric power plant for an aircraft according to a second embodiment of the present invention.

FIG. 5 shows an isometric view of the gearbox 26 of the second embodiment. A single input shaft 21 is connected to the drive shaft of the engine 30 and drives the central drive gear 22. An arrangement of inner driven gears 23 are each driven by the central drive gear 22. Each inner driven gear 23 drives a generator inner drive shaft 24 that extends out both sides of the gearbox 26 with an electric generator 25 connected to both of the two ends. An arrangement of outer driven gears 27 is driven by the inner drive gears 23. Each outer driven gear 27 drives a generator outer drive shaft 28 that also extends out both sides of the gearbox 26. An electric generator 25 is connected on each of the two ends of the generator inner and outer drive shafts 24 and 28. In the second embodiment of FIG. 5, 24 electric generators 25 can be driven by the single input shaft 21 connected to the gas turbine engine 30.

Figure 6:
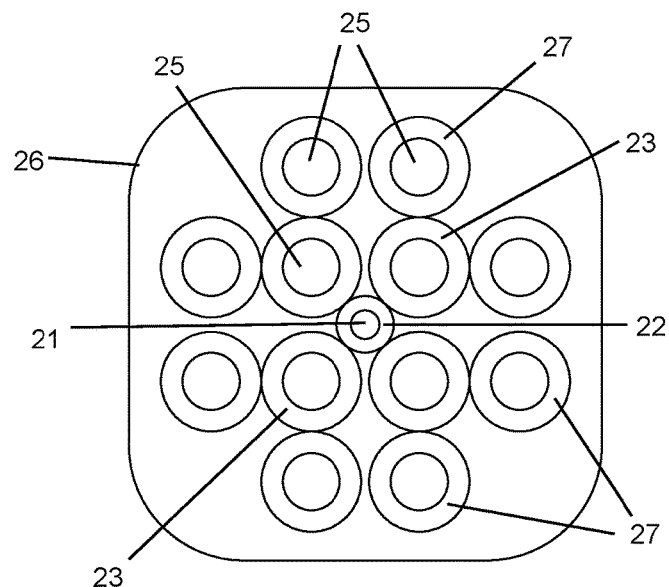
FIG. 6 shows a cross section front view of a gearbox used in the power plant of FIG. 5.
Figure 7:
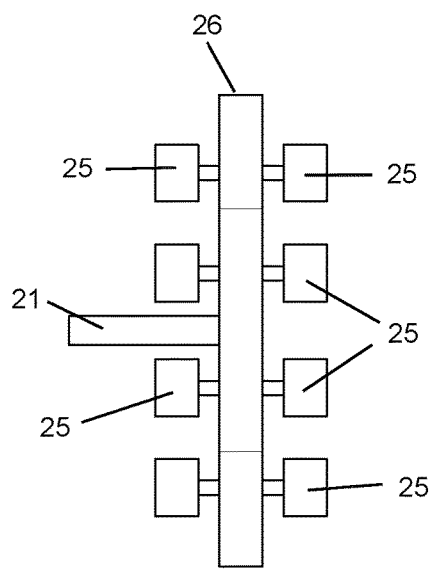
FIG. 7 shows a side view the power plant of FIG. 5.
Figure 8:
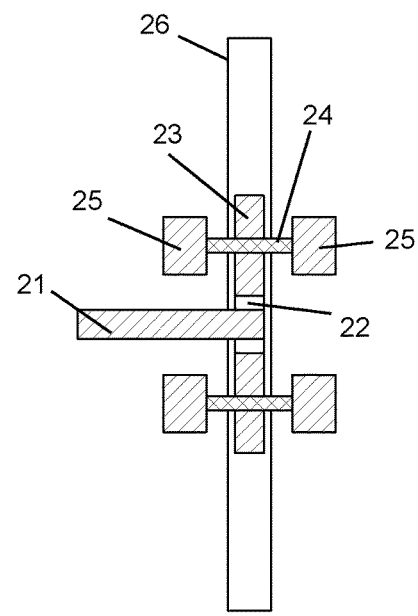
FIG. 8 shows a cross section side view of the power plant of FIG. 5.

FIG. 6 shows a front view of the gearbox of FIG. 5. FIG. 7 shows a side view of the gearbox of FIG. 5. FIG. 7 shows a cross section side view of the gearbox of FIG. 5.

FIG. 9 shows a power plant for a small aircraft such as a UAV with a gas turbine engine 30 driving a gearbox 16 with eight electric generators 15 as in the FIG. 1 embodiment. The electric generators 15 can each be connected to the drive shaft 14 through a clutch so that individual generators can be disengaged from the driven gears. One issue with using multiple generators is that if one fails, the damaged generator could cause damage to adjacent generators. A bad generator if still driven could catch fire and even damage the aircraft. Thus, a clutch or a device that can disengage each generator from its drive shaft can be used to selectively disconnect any generator from being driven. When power load is low, several generators can be disengaged since the engine will operate at its most efficient speed and then generators are connected directly to the input shaft. If required, a step down gearbox can be used between the engine output shaft and the gearbox input shaft to reduce the speed of the input shaft to that for which the generators are designed. A small gas turbine engine might operate at 35,000 rpm while the generators are design to operate at much lower speeds. In this case, a step-down gearbox would be required.

We claim:

1. A power plant for a small aircraft comprising:
   an engine with an output shaft;
   a gearbox with an input shaft driven by the output shaft of the engine;
   a central drive gear connected to the input shaft;
   a plurality of inner driven gears connected to the central drive gear;
   each driven gear having a generator inner drive shaft extending out of the inner driven gear;
   an electric generator connected to each end of the generator inner drive shaft;
   the gearbox includes four inner driven gears with four generator inner drive shafts; and,
   eight electric generators connected to the four generator inner drive shafts with four generators located on a forward side of the gearbox and four generators located on an aftward side of the gearbox.

2. An electric generator assembly comprising:
   an input gear with a central drive gear;
   a plurality of inner driven gears rotatably connected to the central drive gear;
   each inner driven gear having a generator inner drive shaft extending out of the inner driven gears;
   an electric generator connected to each of the ends of the generator inner drive shafts;
   four inner drive gears are rotatably connected to the central drive shaft; and,
   eight electric generators are connected to four generator drive shafts with four generators on a forward side of the driven gears and four generators on an aftward side of the driven gears.

3. An electric generator assembly comprising:
   a drive shaft with a drive gear;
   a plurality of driven shafts each with a driven gear rotatably driven by the drive gear;
   each of the driven shafts having a first electric generator on one side of the driven shaft and a second electric generator on an opposite side of the driven shaft.

4. The electric generator assembly of claim 3, and further comprising:
   each electric generator is connected to a separate electric motor to supply electrical power.

5. The electric generator assembly of claim 3, and further comprising:
   the electric generator assembly is a power plant for an unmanned aero vehicle with a plurality of fans each driven by an electric motor supplied with electrical power from the electric generators.

* * * * *